United States Patent [19]

Kimura et al.

[11] Patent Number: 4,959,748
[45] Date of Patent: Sep. 25, 1990

[54] FILM CAPACITOR, METHOD OF AND APPARATUS FOR MANUFACTURING THE SAME

[75] Inventors: Tadashi Kimura, Yawata; Tanejiro Ikeda, Nara; Hisaaki Tachihara; Kunio Oshima, both of Matsue, all of Japan

[73] Assignee: Matsushita Electric Industrial Co., Ltd., Osaka, Japan

[21] Appl. No.: 329,351

[22] Filed: Mar. 27, 1989

[30] Foreign Application Priority Data

Mar. 30, 1988 [JP] Japan ................... 63-76797

[51] Int. Cl.⁵ .......... H01G 4/08; H01G 1/14; H01G 4/06
[52] U.S. Cl. .................. 361/323; 29/25.42; 361/309
[58] Field of Search .......... 29/25.42; 361/308, 309, 361/310, 323

[56] References Cited

U.S. PATENT DOCUMENTS

| | | | |
|---|---|---|---|
| 3,257,305 | 6/1966 | Varga | 29/25.42 X |
| 3,397,085 | 8/1968 | Cariou et al. | 29/25.42 X |
| 3,783,480 | 1/1974 | Booe | 29/25.42 |
| 4,504,884 | 3/1985 | Vetter | 361/309 X |

FOREIGN PATENT DOCUMENTS 480713 2/1938 United Kingdom ................ 361/309

*Primary Examiner*—Donald A. Griffin
*Attorney, Agent, or Firm*—Stevens, Davis, Miller & Mosher

[57] ABSTRACT

A film capacitor having metallic layer electrodes, organic dielectric films interposed between the metallic layer electrodes, and a pair of end surface electrodes disposed at the opposite ends of the capacitor and alternately connected to the metallic layer electrodes. The end surfaces of the dielectric films adjacent to each other and located at the opposite end surfaces of the capacitor are formed with irregularities. This capacitor is manufactured by a method including: the steps of preparing a lamination or roll of a plurality of electrodes and organic dielectric films interposed between the electrodes, selectively removing portions of the dielectric films at the electrode-lead-out-end sides of the roll or lamination where end surfaces of the dielectric films are flush with those of the electrodes by bringing surfaces of the roll or lamination at the electrode-lead-out-end sides in contact with a gas having at least a component reactive with the organic dielectric; and forming end-surface electrodes at the electrode-lead-out-end sides.

20 Claims, 14 Drawing Sheets

FIG. IA
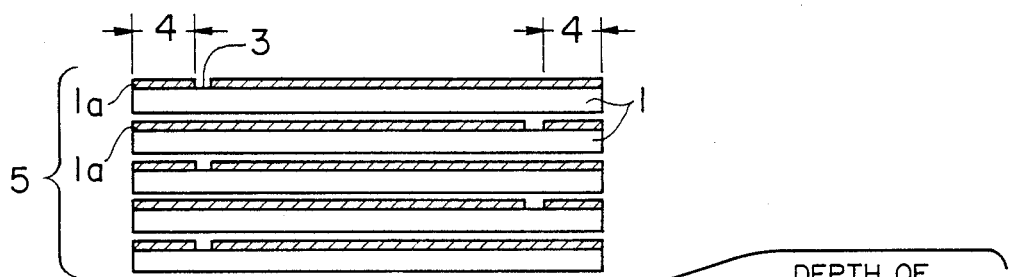
FIG. IB
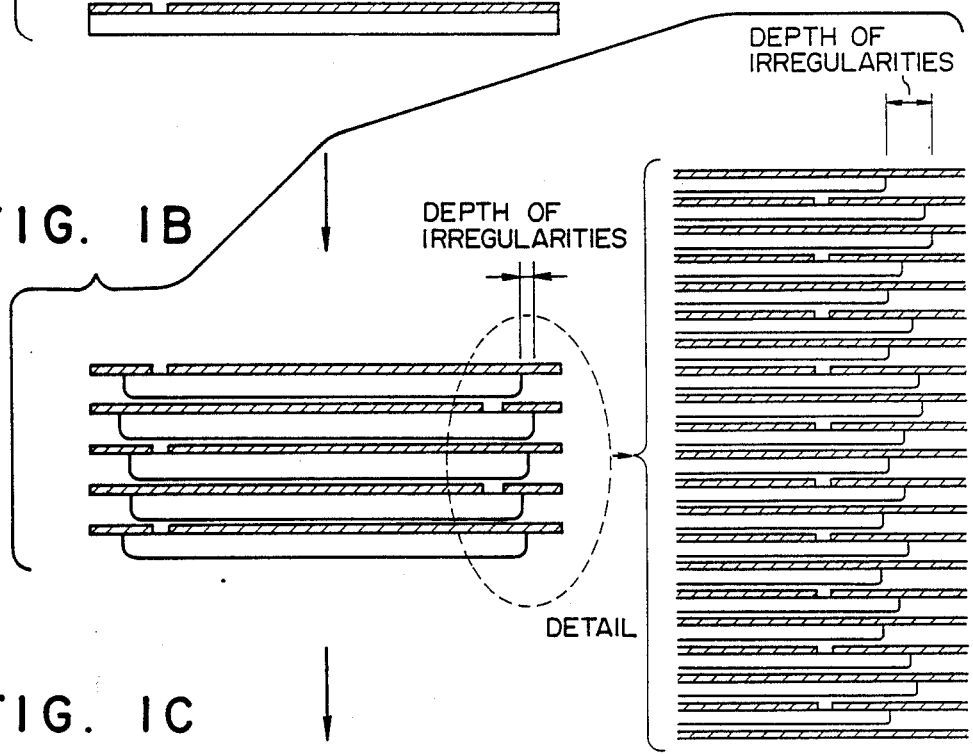
FIG. IC
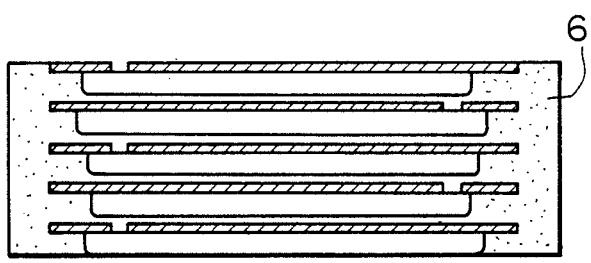

CUTTING POSITION

CUTTING

FILM CAPACITOR, METHOD OF AND APPARATUS FOR MANUFACTURING THE SAME

BACKGROUND OF THE INVENTION

1. Field of the Invention

This invention relates to a film capacitor and a method of and apparatus for manufacturing the film capacitor.

2. Description of Related Art

Recently, there are increasing demands for reducing electronic parts in size, weight and price while improving the performance. Development of film capacitors is being promoted with a view to providing capacitors smaller in size and improved in performance.

A method of manufacturing conventional laminated film capacitors will be described below with reference to the accompanying drawings.

FIG. 18A shows an ideal construction of a conventional laminated film capacitor.

A capacitor body illustrated in FIG. 18A has one-side-metallized films 1, metallic layers 1a which serve as electrodes, and blank sections or non-metallized portions 3.

Conventionally, the one-side-metallized films 1 are laminated while being shifted alternately (overlapped) in the widthwise direction of the films (by a minimum of about 0.2 mm at present) and are rolled up in order to form film spaces 2 at end surfaces where end surface electrodes for the capacitor are to be formed. The film spaces 2 are thereby formed so that the extent of intrusion of contact layers formed from metallikon as end surface electrodes becomes sufficient, thereby obtaining suitable electrical connection between the end surface electrodes or the contact layers (not shown) and the electrodes 1a of the one-side-metallized films 1 as well as sufficient strength of attachment of the end surface electrodes.

In this method, however, an accurate rolling system is required for rolling up the one-side-metallized films 1, and it is difficult to keep the extent of shifting about 0.2 mm owing to meandering of the films in the case where the width of the films is reduced in order to reduce the size of the capacitor or the thickness of the films is reduced in order to increase the capacitance. Actually, the films are shifted as shown in FIG. 18B. This method, therefore, entails problems of inferior yield stability, a high production cost of the manufacturing apparatus and difficulty in designing a smaller film capacitor. A method of rolling up wide one-side-metallized films having a plurality of capacitor bodies and cutting the thus obtained roll into unit capacitors is advantageous because it enables a high productivity. This method, however, cannot be applied to manufacture of the above-described type of capacitors because it does not enable formation of the film spaces 2. In accordance with the conventional applicable methods, a wide one-side-metallized film having a plurality of capacitor bodies is divided by cutting into unit capacitor bodies, and the divided one-side-metallized films are rolled up to produce capacitors. Therefore the productivity of processes based on the conventional methods is considerably low.

To cope with these problems, a type of method such as the one disclosed in Japanese Laid-Open Patent Publication No. 58-24933 has been developed. In this method, through holes or perforations are formed being spotted in electrode-lead-out portions of wide one-side-metallized films each having a plurality of capacitor bodies. These films are rolled up and a roll thereby formed is cut at the electrode-lead-out portions perpendicularly to electrode-lead-out surfaces thereof, thereby leaving film spaces 2.

This method will be described below with reference to FIGS. 19 to 21.

A one-side-metallized film 1 shown in FIGS. 19 to 21 has a metallic layer 1a, blank sections 3, margin sections defined by a margin width 4, and through-holes 9.

In accordance with this method, the wide one-side-metallized film 1 is formed with a plurality of metallic electrodes 1a and a plurality of blank sections 3a, and a plurality of through holes 9 are provided within pairs of adjacent margin sections of the metallized film 1 defined by the margin width 4, as shown in FIG. 19. A plurality of metallized films 1 thus formed are rolled up while being superposed on each other in such a manner that, as shown in FIG. 20, they are alternately shifted from each other to an extent corresponding to ½ of the distance between the pairs of adjacent margin sections. A roll thereby formed is cut at the centers of the pair of margin sections or electrode-lead-out surfaces, thereby dividing the roll into a plurality of mother capacitor bodies each corresponding to the element shown in FIG. 21. Film spaces 2 are thus formed from the through-holes 9 so that the extent of intrusion of contact layers formed from metallikon as end surface electrodes 6 into the end surfaces of each element becomes sufficient, as shown in FIG. 22A, thereby obtaining desired electrical contact between the contact layers and the electrodes 1a of the one-side-metallized films 1 as well as sufficient strength of attachment of the end surface electrodes. Thereafter, each mother capacitor body 5 is cut in the direction perpendicular to the direction in which the margin sections extend, thereby obtaining unit capacitor bodies 51, as shown in FIGS. 22B and 22C. FIG. 22B is a perspective view of the capacitor body shown in FIG. 22A.

This construction, however, entails a problem of difficulty in establishing desired electrical contact between the contact layers and the electrodes 1a of the one-side-metallized films 1. That is, burrs formed at the periphery of the through holes 9 displace the closed films and block the film spaces 2 or, if the thickness of the films is reduced to 2.0 μm or less, the films become slackened due to its flexibility and block the film spaces 2, so that the extent of intrusion of the contact layers formed from metallikon becomes inadequate, resulting in failure to establish the desired electrical contact.

To solve these problems, a method such as the one disclosed in Japanese Laid-Open Patent Publication No. 59-37564 has been proposed. In this method of manufacturing film capacitors, the electrode-lead-out surfaces at which all the end surfaces of the dielectric members are made flush with each other are etched by reverse sputtering to expose electrodes.

In application of this method to the industrial process, there are problems of a high production cost of the manufacturing apparatus, a slow etching speed of the physical etching and, hence, a low productivity. Moreover, in this method, etching is made even to the electrodes, and a high voltage is applied to components of the film capacitor during etching, and accordingly the capacitor is damaged by irradiation of ions or electrons, resulting in failure to obtain desired capacitor characteristics.

SUMMARY OF THE INVENTION

In view of the problems of the conventional methods, it is an object of the present invention to provide a laminated or rolled film capacitor improved in electrical contact between the metallic layer electrodes and the end surface electrodes and in the strength of attachment of the end surface electrodes, and to provide a method of manufacturing this capacitor, which method enables such an improved film capacitor to be obtained even from a laminated or rolled film capacitor body having flat electrode-lead-out-end sides and formed by alternately superposing dielectric members made of an organic material and metallic layer electrodes on each other.

In accordance with a method of the present invention, the end surfaces of film capacitor body which are to be processed for connection to lead electrodes are brought into contact with a gas having at least a component reactive with an organic material constituting a dielectric film of the capacitor body, thereby enabling portions of the dielectric film at the electrode-lead-out-end sides to be chemically removed selectively.

Metallic layer electrodes of the capacitor body are thereby exposed out of the end surfaces so that the strength of attachment of end surface electrodes to the exposed electrodes is increased and desired electrical contact is established therebetween.

BRIEF DESCRIPTION OF THE DRAWINGS

FIGS. 1A to 1C are diagrams of essential steps of a laminated film capacitor manufacture process which represents a first embodiment of the present invention;

DESCRIPTION OF THE PREFERRED EMBODIMENTS

[Embodiment 1]

Figure 2:
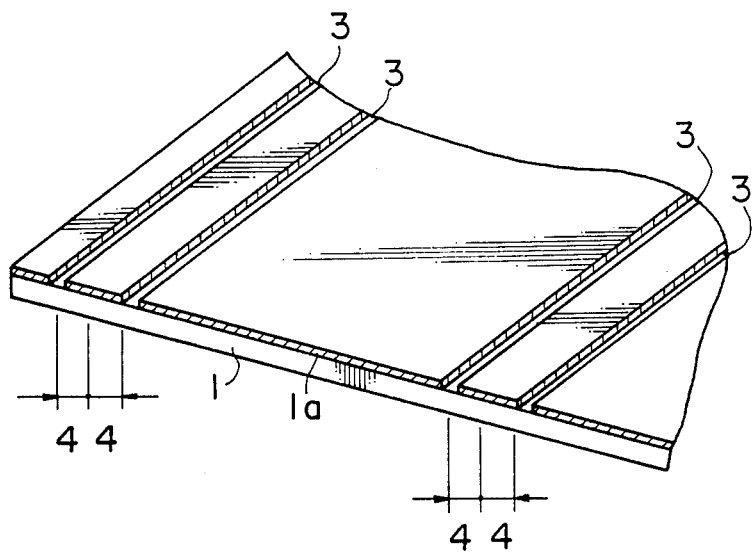
FIG. 2 is a diagram of a wide one-side-metallized film provided with a plurality of blank sections in order to form a plurality of capacitor bodies.

FIGS. 1A to 1C show essential steps of a laminated film capacitor manufacture process which represents a first embodiment of the present invention.

In FIG. 1A to 1C are illustrated one-side-metallized films formed of polyphenylene sulfide (PSS) films, aluminum deposited layers 1a which serve as electrodes, blank sections 3, margin sections defined by a margin width 4, a mother capacitor body 5 and end surface electrodes 6.

FIG. 2 shows a wide one-side-metallized films 1 with a plurality of margin sections 3 for production of a plurality of capacitor bodies.

Figure 4:
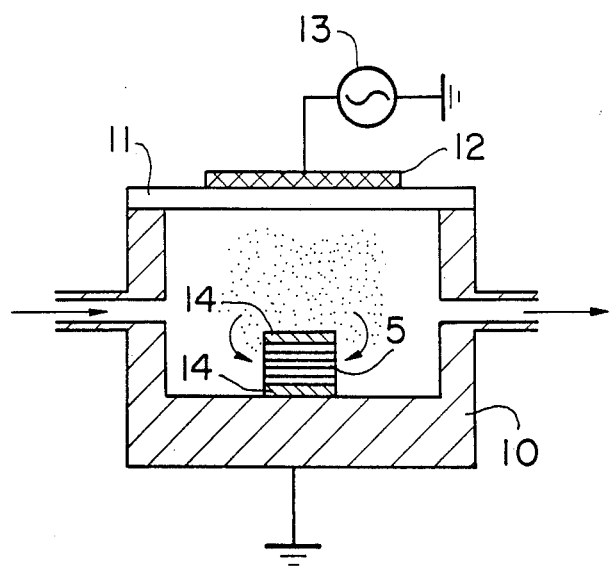
FIG. 4 is a diagram of the construction of an oxygen plasma processing apparatus used in the first embodiment.

FIG. 4 shows an oxygen plasma processing apparatus in accordance with this embodiment. The apparatus has a vacuum vessel 10 which can be maintained in a decompressed state, a quartz window 11, an electrode 12 to which a high frequency wave is applied, a high frequency power source 13, and a mask 14 formed from aluminum.

Figure 3:
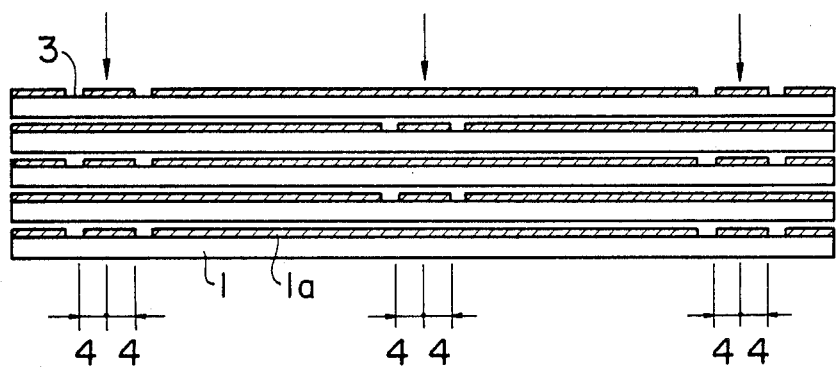
FIG. 3 is a diagram of laminated films each equivalent to that shown in FIG. 2.

In this embodiment, the one-side-metallized films 1 are first laminated or rolled up in such a manner that, as shown in FIG. 3, two groups of pairs of adjacent margin sections 4 respectively formed on adjacent two of the metallized films 1 superposed one upon another are shifted from each other to an extent corresponding to ½ of the distance between the pairs of adjacent margin sections 4. A roll or lamination thereby formed is cut at the centers of the pair of margin sections 4, i.e., electrode-lead-out surfaces, thereby forming a plurality of mother capacitor bodies 5 having flat electrode-lead-out-end sides, as shown in FIG. 1A.

Next, end surfaces of each mother capacitor body 5 which are to be processed for connection to lead electrodes are brought into contact with oxygen gas plasma in the oxygen plasma processing apparatus shown in FIG. 4. Portions of the films 1 at the electrode-lead-outend sides having a width smaller than the margin width 4 are selectively removed, as shown in FIG. 1B, so that the electrodes 1a of the one-side-metallized films 1 are exposed out of the end surfaces, and that the end surfaces of the dielectric at the electrode-lead-out-end sides are formed with irregularities or are roughened irregularly over 90% or more of their areas while limiting the depth of irregularities to at most 0.2 mm. Thereafter, brass is sprayed on the end surfaces to form end surface electrodes 6, as shown in FIG. 1C, and the mother capacitor body 5 is cut in the direction perpendicular to the direction in which the margin sections extend, thereby obtaining unit capacitor bodies.

In experiment, etching was carried out with the oxygen plasma processing apparatus under conditions of an oxygen flow rate of 60 SCCM, pressure of 1.0 Torr and high frequency wave power of 400 W.

Portions of the organic film are removed by oxygen plasma in such a manner that oxygen radicals in oxygen plasma attack bonding such as C—C, C—H, C—S or the like of the organic film so that the organic material is changed into gasses such as $CO_2$, $H_2O$ or $SO_2$ and these gases are discharged.

In this process of selectively removing the laminated or rolled one-side-metallized films in part at the positions of the end surface electrodes, it is possible that because it is easier for oxygen radicals to penetrate each metallized film at the non-metallized side thereof where a very small gap is left after lamination or rolling than at the metallized side, the corresponding film portion is removed at a higher rate so that the end surface of each film is tapered.

Figure 5:
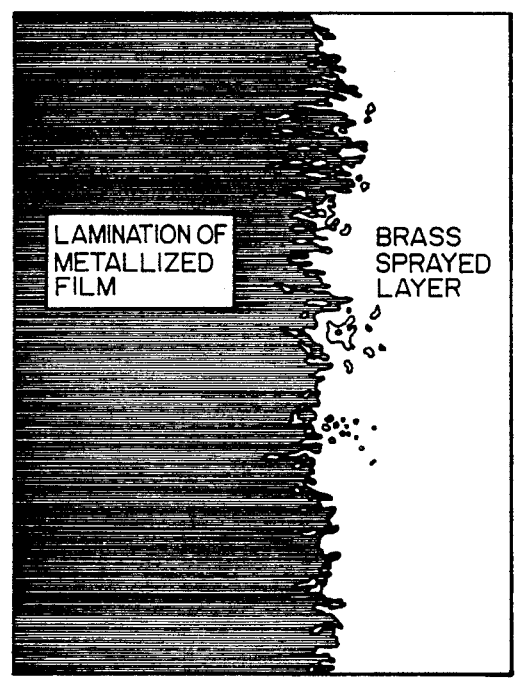
FIG. 5 is an enlarged cross-sectional view of the electrode-lead-out-end surface of the film capacitor manufactured in accordance with the present invention.

The mother capacitor body 5 shown in FIG. 1C is in an ideal state wherein aluminum deposited layers 1a are embedded in the end surface electrodes 6 formed by spraying. This illustration represents a film capacitor which can be formed in such a condition that the thickness of the aluminum deposited layers 1a is sufficiently large. If the thickness of the aluminum layers is small, it is very difficult to confirm the embedded portions of the deposited layers 1a with the human eyes, as illustrated in FIG. 5. In this case, it is considered that the aluminum deposited layers 1a are pressed on the electrode-lead-out-end surfaces by sprayed brass particles or they are embedded into or mixed in the sprayed brass layers so as to form an eutectic. In the example shown in FIG. 5 in section, the thickness of the films is 2 $\mu$m, the thickness of the aluminum deposited layers is 300 Å, and the number of the laminated films is 190.

As shown in FIG. 5, irregularities in the electrode-lead-out-end surface are different from those in the corresponding surface formed by the stagger-rolling method described above as related conventional art; they have small depths within a certain range and exhibit no regularity; and they are formed over the whole of the electrode-lead-out-end surface. At the electrode-lead-out-end surface, the end surface of each film is undulated in the direction perpendicular to the paper owing to difference in film removing speed. At least a portion of the electrode on each film to be in contact with the end surface electrode is thereby exposed. This structure of the electrodes including projection of the electrodes from the end surface is improved in stability in terms of manufacture and it enables a reduction in the size of the resulting film capacitor. It is possible to control the depth of irregularities by changing adhesion between the laminated films before the selective removal. The depth of irregularities is small if the adhesiveness between the laminated films is made to be high by pressing the latter, or it is large if the adhesiveness between the films is low.

The strength of attachment of the end surface electrode depends upon the depth of irregularities; it becomes larger if the depth of irregularities is increased. However, it is sufficient to set the depth of irregularities to at most 0.1 mm in the case of design of a small film capacitor. Even a strength of attachment of the end surface electrode when the depth of irregularities is about 10 $\mu$m is sufficient. It is therefore desirable to control the depth of irregularities on the basis of the use of the capacitor.

As described above, in accordance with this embodiment, the end surfaces of mother capacitor body 5 which are flat and which are to be processed for connection to lead out electrodes are brought into contact with oxygen gas plasma in the oxygen plasma atmosphere, and only film portions at the end surfaces having a width smaller than the margin width 4 are selectively removed, thereby exposing the electrodes 1a of the one-side-metallized films 1 out of the end surfaces. At the same time, the electrode-lead-out-end surfaces are formed with irregularities over 90% or more of their areas while limiting the depth of irregularities to at most 0.2 mm. It is thereby possible to obtain a suitable electrical contact between the electrodes 1a and the end surface electrodes as well as a sufficient strength of attachment of the end surface electrode 6. The film capacitor can therefore be reduced in size and improved in producibility in terms of mass production.

Figure 6:
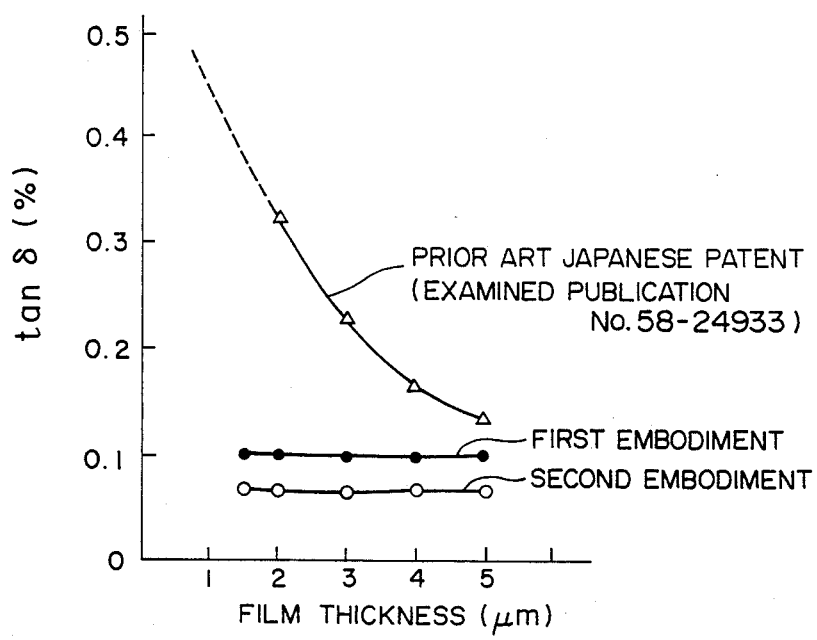
FIG. 6 is a graph of the relationship between the thickness and than $\delta$ of each of laminated films manufactured in accordance with the present invention and another laminated film based on the conventional art, illustrating comparison therebetween.

FIG. 6 shows comparison between a rolled film capacitor in accordance with this embodiment and a rolled film capacitor formed of PPS films proposed by Japanese Laid-Open Patent Publication No. 58-24933 and a laminated film capacitor proposed by Japanese Laid-Open Patent Publication No. 59-37564 with respect to the relationship between tan $\delta$ and the thickness of films of these film capacitors.

As can be understood from FIG. 6, characteristics of the film capacitor in accordance with the present invention is superior than those of the film capacitors manufactured on the basis of the conventional art.

Figure 7:
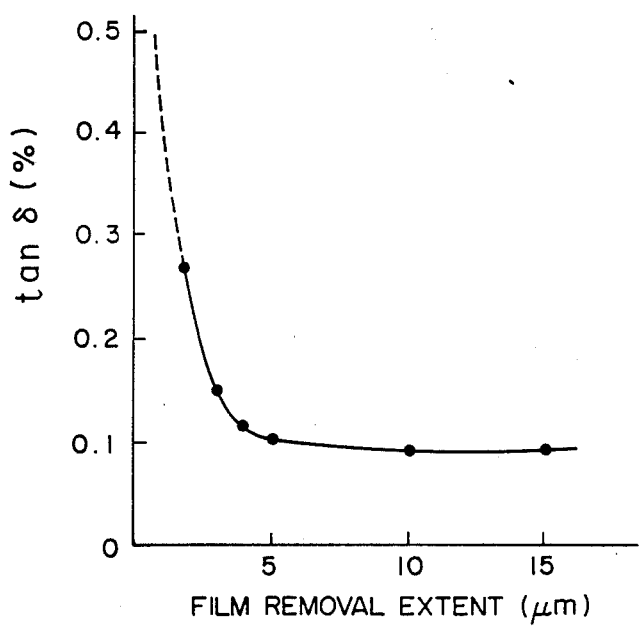
FIG. 7 is a graph of the relationship between the film removal extent and than $\delta$ of the film capacitor manufacture in accordance with the first embodiment.

FIG. 7 shows the relationship between tan $\delta$ and the film removal extent of the film capacitor in accordance with this embodiment.

As can be understood from FIG. 7, it is possible to obtain suitable capacitor characteristics by removing film portions between the original end surface and a position at a distance of 5 $\mu$m or more therefrom. The removal of 5 $\mu$m film portions enables desired electrical contact but it is not enough to form sufficient irregularities in the electrode-lead-out-end surface and to ensure a sufficient strength of attachment of the end surface electrode. If the removal extent is limited to this value, it is necessary to reinforce the end surface electrode with a resin or the like fitted from outside.

[Embodiment 2]

A second embodiment of the present invention will be described below.

Figure 8:
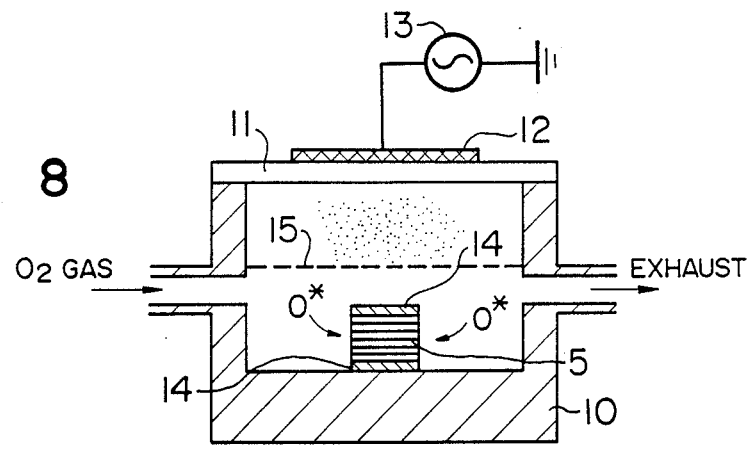
FIG. 8 is a diagram of the construction of an oxygen plasma processing apparatus used in a second embodiment of the present invention.

FIG. 8 shows the construction of an oxygen plasma processing apparatus in accordance with this embodiment.

This apparatus differs from the apparatus shown in FIG. 4 in that a grounded metallic mesh 15 is interposed between the electrode 12 to which a high frequency voltage is applied and the film capacitor body 5.

This arrangement ensures that oxygen ions are trapped with the metallic mesh 15 and only oxygen radicals reach the film capacitor body 5 when plasma is generated between the electrode 12 and the metallic mesh 15 by application of a high frequency voltage to the electrode 2, thereby reducing damage to the film capacitor due to irradiation of ions.

First, mother capacitor bodies 5 are formed in the same manner as that described with respect to the first embodiment. Thereafter, the end surfaces which are to be processed for connection to lead electrodes are selectively removed by the oxygen plasma processing apparatus shown in FIG. 8 using oxygen radicals to an extent smaller than the margin width 4. Only portions of the films at the end surfaces thereof are thereby removed selectively. At this time, the electrodes 1a of the one-side-metallized films 1 are exposed out of the end surfaces so that electrode-lead-out-end surfaces are formed with irregularities or are irregularly roughened continuously over 90% or more of their areas while limiting the depth of irregularities in the end surfaces to at most 0.2 mm. Thereafter, brass is sprayed on the end surfaces to form the end surface electrodes, and each mother capacitor body is cut in the direction perpendicular to the direction in which the margin sections extend, thereby obtaining unit capacitor bodies.

In accordance with this embodiment, only the end surface portions of the films are selectively removed by using oxygen radicals so that the electrodes 1a are exposed out of the end surfaces and that the electrode-lead-out-end surfaces are formed with irregularities over 90% or more of their areas while limiting the depth of irregularities in the end surfaces to at most 0.2 mm, thereby obtaining suitable electrical contact between the electrodes 1a and the end surface electrodes 6 as well as a sufficient strength of attachment of the end surface electrode 6. Moreover, the resulting film capacitor has improved characteristics because it is free from any considerable damage caused by ions.

FIG. 6 shows characteristics of film capacitors manufactured in accordance with this and first embodiments with respect to the relationship between the thickness and tan δ.

As can be understood from FIG. 6, the film capacitor in accordance with this embodiment is superior than that in accordance with the first embodiment. It is considered that since etching is effected by using oxygen radicals alone in this embodiment, the capacitor of this embodiment is not damaged by ions as in the case of the first embodiment.

[Third Embodiment]

A third embodiment of the present invention will be described below.

Figure 9A:
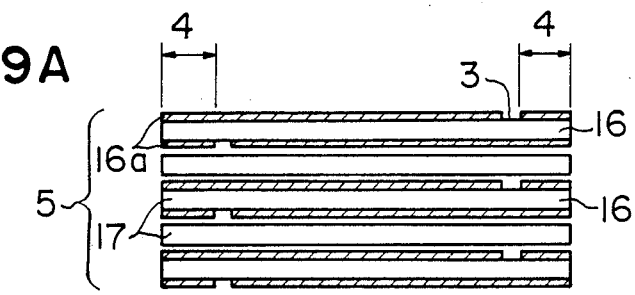
FIGS. 9A to 9C are diagrams of essential steps of the process of manufacturing a laminated film capacitor in accordance with a third embodiment of the present invention.
Figure 9B:
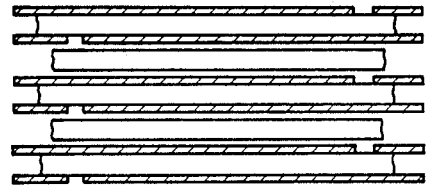
Figure 9C:
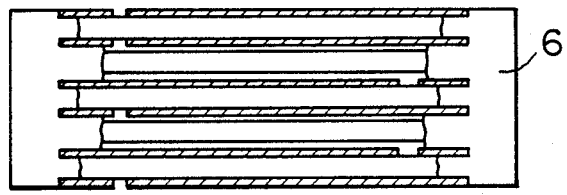

FIGS. 9A to 9C show essential steps of a process of manufacturing a laminated film capacitor in accordance with this embodiment.

A reference character 16 in these figures denotes two-side-metallized films each formed of a wide PPS film and having a plurality of capacitor bodies. Each film is metallized in such a manner that two groups of pairs of adjacent margin sections 4 of two aluminum deposited layers respectively formed as electrodes 16a on opposite sides of each metallized film 16 are shifted from each other to an extent corresponding to ½ of the distance between the pairs of adjacent margin sections 4. A reference character 17 denotes wide PPS films laminated together with the films 16.

This embodiment differs from the first and second embodiments in that the wide two-side-metallized films 16 and the films 17 are rolled up or laminated while being alternately superposed on each other.

In this embodiment, the wide two-side-metallized films 16 and the wide films 17 are first alternately superposed on each other and are rolled up or laminated. A roll or lamination thereby obtained is cut at the centers of the pairs of adjacent margin sections or electrode-lead-out surfaces 4, thereby forming mother capacitor bodies 5 each corresponding to the element shown in FIG. 9A. Then, the electrode-lead-out-end surfaces of each mother capacitor body 5 are brought into contact with a gas which contains about 5% concentration of ozone gas. Portions of the films at the electrode-lead-out-end sides having a width smaller than the margin width 4 are thereby removed selectively, as shown in FIG. 9B, so that the electrodes 16a of the two-side-metallized films 16 are exposed out of the end surfaces, and that the electrode-lead-out-end surfaces are formed with irregularities or are roughened irregularly over 90% or more of their areas while limiting the depth of irregularities in the end surfaces to at most 0.2 mm. Thereafter, as shown in FIG. 9C, brass is sprayed on the end surfaces to form the end surface electrodes 6, and the mother capacitor body 5 is cut in the direction perpendicular to the direction in which blank sections 3 extend, thereby obtaining unit capacitor bodies.

In accordance with this embodiment, the electrode-lead-out-end surfaces of the mother capacitor body 5 are selectively removed by being brought into contact with ozone gas so that the electrodes 16a of the two-side-metallized films 16 are exposed out of the end surfaces and that the electrode-lead-out-end surfaces are formed with irregularities over 90% or more of their areas while limiting the depth of irregularities to at most 0.2 mm, thereby obtaining suitable electrical contact between the electrodes 16a and the end surface electrodes 6 as well as a sufficient strength of attachment of the end surface electrodes 6 when the end surface electrodes 6 are formed.

This embodiment enables film portions to be selectively removed under atmospheric pressure, which effect cannot be attained by the first and second embodiments. The method in accordance this embodiment is thus improved in productivity, but in practice it necessitates a devised gas blowing system capable of uniformly removing end surfaces portions of the films.

[Embodiment 4]

A laminated film capacitor manufacture process which represents a fourth embodiment of the present invention will be described below.

Figure 10A:
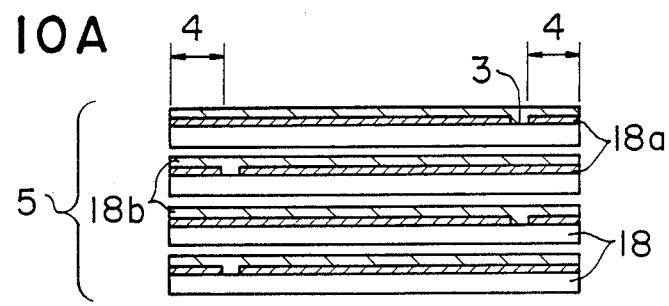
FIGS. 10A to 10C are diagrams of essential steps of the process of manufacturing a laminated film capacitor in accordance with a fourth embodiment of the present invention.
Figure 10B:
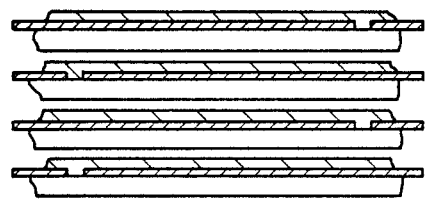
Figure 10C:
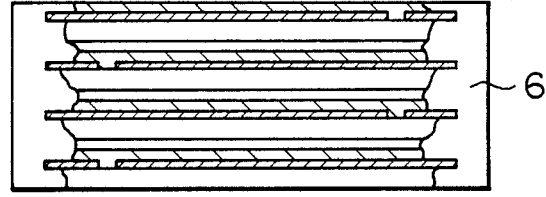

FIGS. 10A to 10C show part of a process of this embodiment. A reference character 18 in these figures denotes one-side-metallized films each formed of a wide PPS film and having a plurality of capacitor bodies. A dielectric 18b which is polyphenylene oxide (PPO) is applied to the metallized side of each of the wide one-side metallized films 18 over the entire area thereof without forming any pattern.

The wide one-side-metallized films 18 to which the dielectric 18b has been applied are first rolled up or laminated in such a manner that two groups of pairs of adjacent margin sections 4 formed in adjacent two of the one-side-metallized films 18 are shifted from each other to an extend corresponding to ½ of the distance between the pairs of adjacent margin sections 4. A roll or lamination thereby obtained is cut at the centers of the pairs of adjacent margin sections or electrode-lead-out surfaces 4, thereby forming mother capacitor bodies 5 each corresponding to the element shown in FIG. 10A. Then, the electrode-lead-out-end surfaces of each mother capacitor body 5 are brought into contact with oxygen radicals generated by the oxygen plasma processing apparatus shown in FIG. 4, thereby selectively removing portions of the films and the layers of dielectric 18b at the electrode-lead-out-end sides having a width smaller than the margin width 4, as shown in FIG. 10B. Thereafter, brass is sprayed on the end surfaces to form the end surface electrodes 6, as shown in FIG. 10C, and the mother capacitor body 5 is cut in the direction perpendicular to the direction in which blank sections 3 extend, thereby obtaining unit capacitor bodies.

In accordance with this embodiment, portions of the films 18 and the dielectric layers 18b at the electrode-lead-out-end surfaces of the mother capacitor body 5 are selectively removed by being brought into contact with oxygen radicals so that electrodes 18a of the metallized films 18 are exposed out of the end surfaces and that the electrode-lead-out-end surfaces are formed with irregularities over 90% or more of their areas while limiting the depth of irregularities in the end surfaces to at most 0.2 mm, thereby obtaining suitable electrical contact between the electrodes 18a and the end surface electrodes 6 as well as a sufficient strength of attachment of the end surface electrodes 6 when the end surface electrodes 6 are formed.

Conventionally, one-side-metallized films to which a dielectric is applied and which are laminated to manufacture film capacitors are films on which dielectric patterns are formed in such a manner that no dielectric is applied to portions of electrodes which are to be brought into contact with end surface electrodes. This embodiment eliminates the need for such patterns and is therefore practical and improved in producibility in terms of mass production.

[Embodiment 5]

A laminated film capacitor manufacture process which represents a fifth embodiment of the present invention will be described below.

Figure 11A:
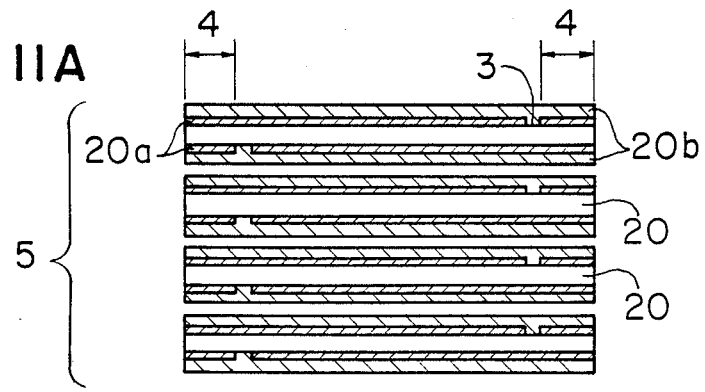
FIGS. 11A to 11C are diagrams of essential steps of the process of manufacturing a laminated film capacitor in accordance with a fifth embodiment of the present invention.
Figure 11B:
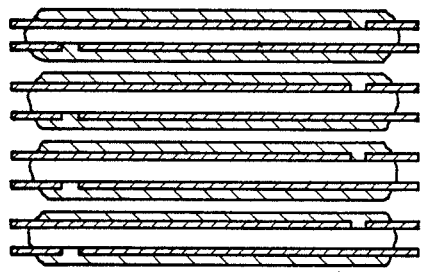
Figure 11C:
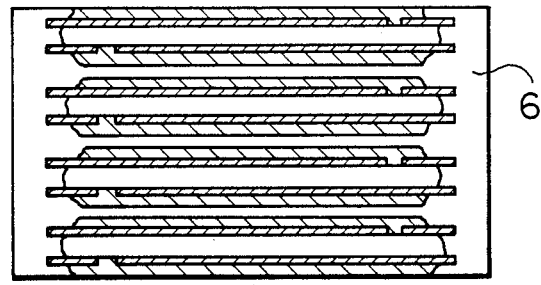

FIGS. 11A to 11C show part of a process of this embodiment. A reference character 20 in these figures denotes two-side-metallized films each formed of a wide PPS film and having a plurality of capacitor bodies. Each film is metallized in such a manner that two groups of pairs of adjacent margin sections 4 of two aluminum deposited layers respectively formed as electrodes 20a on opposite sides of each metallized film 20 are shifted from each other to an extent corresponding to ½ of the distance between the pairs of adjacent margin sections 4. A dielectric 20b which is PPO is applied to both surfaces of each two-side-metallized film 20 without forming any pattern.

First, the wide two-side-metallized films 20 to which the dielectric 20b is applied over their both surfaces are rolled up or laminated in such a manner that, as shown in FIGS. 11A to 11B, blank sections 3 on upper or lower sides of the films are aligned with each other. A roll or lamination thereby obtained is cut at the centers of the pairs of adjacent margin sections or electrode-lead-out surfaces 4, thereby forming mother capacitor bodies 5 each corresponding to the element shown in FIG. 11A. Then, the electrode-lead-out-end surfaces of each mother capacitor body 5 are brought into contact with a plasma containing a fluorine gas such as $SF_6$ or $CF_6$ gas. Portions of the films and the dielectric layers 20b at the electrode-lead-out-end sides having a width smaller than the margin width 4 are thereby removed selectively, as shown in FIG. 11B. Thereafter, as shown in FIG. 11C, brass is sprayed on the end surfaces to form the end surface electrodes 6, and the mother capacitor body 5 is cut in the direction perpendicular to the direction in which blank sections 3 extend, thereby obtaining unit capacitor bodies.

In accordance with this embodiment, the electrode-lead-out-end surfaces of the mother capacitor body 5 are selectively removed by being brought into contact with a plasma containing a fluorine gas so that the electrodes 20a of the two-side-metallized films 20 are exposed out of the end surfaces and that the electrode-lead-out-end surfaces are formed with irregularities over 90% or more of their areas while limiting the depth of irregularities to at most 0.2 mm, thereby obtaining suitable electrical contact between the electrodes 20a and the end surface electrodes 6 as well as a sufficient strength of attachment of the end surface electrodes 6 when the end surface electrodes 6 are formed.

In the process of selectively removing the dielectric and the films in accordance with the present invention, no oxygen gas is used. Therefore there is no risk of oxidation. In this respect, this embodiment differs from the first to third embodiments. However, it is desirable to carefully select the method of this embodiment in consideration of the use of the capacitor because the processing speed is lower than that in a case where oxygen gas is used.

[Embodiment 6]

A rolled film capacitor manufacture process which represents a sixth embodiment of the present invention will be described below.

Figure 12:
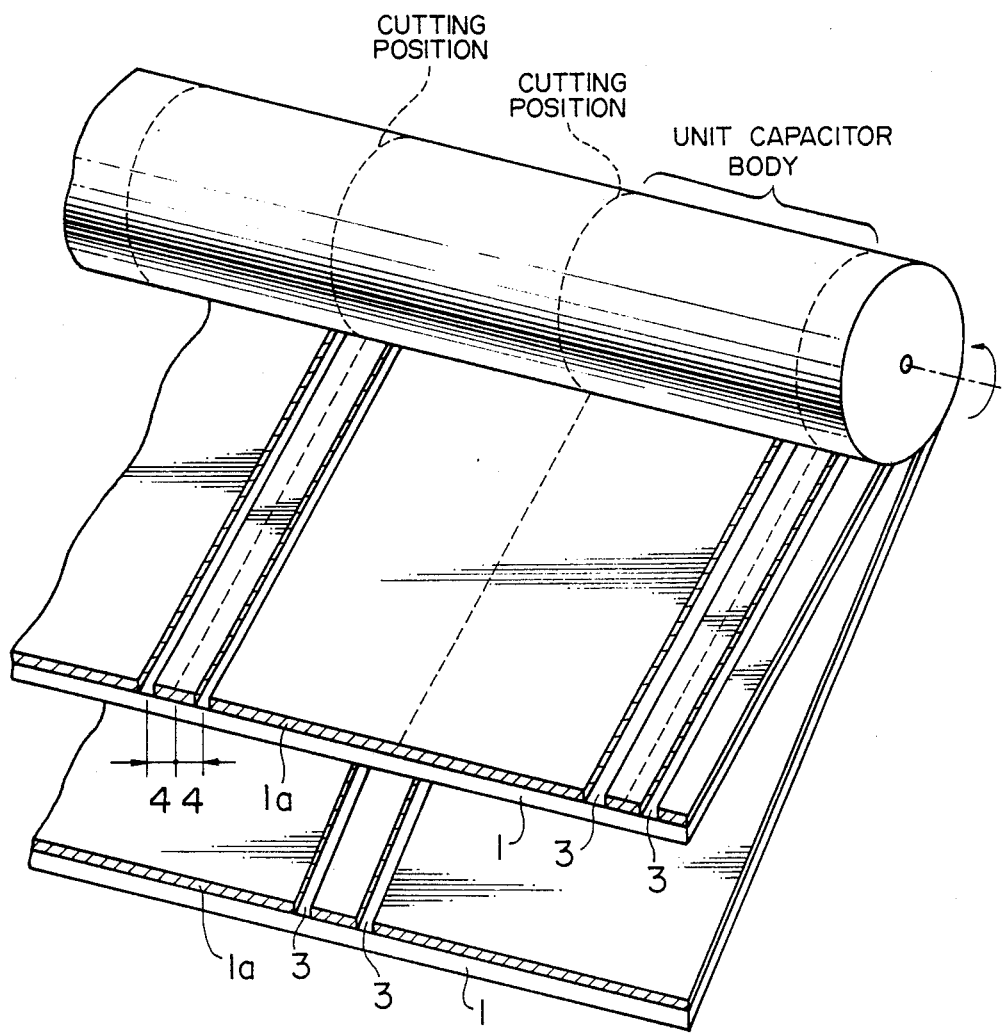
FIG. 12 is a diagram of an essential step of the process of manufacturing a rolled film capacitor in accordance with a sixth embodiment of the present invention.

FIG. 12 shows part of a process of this embodiment. A reference numeral 1 in FIG. 12 denotes one-side-metallized films each formed of a wide PPS film and having a plurality of capacitor bodies. Each one-side metallized film 1 is the same as that used in the first and second embodiments.

First, the wide one-side-metallized films 1 are rolled up or laminated in such a manner that, as shown in FIG. 12, two groups of pairs of adjacent margin sections 4 formed in adjacent two of the one-side-metallized films 1 are shifted from each other to an extent corresponding to ½ of the distance between the pairs of adjacent margin sections 4. A roll thereby obtained is cut at the centers of the pairs of adjacent margin sections or electrode-lead-out surfaces 4 to form unit capacitor bodies. The electrode-lead-out-end surfaces of each unit capacitor body are brought into contact with hydrogen gas plasma generated by the apparatus shown in FIG. 4, thereby selectively removing portions of the films at the electrode-lead-out-end sides having a width smaller than the margin width 4. Thereafter, brass is sprayed on the end surfaces to form the end surface electrodes 6, thereby obtaining a rolled film capacitor body.

In accordance with this embodiment, the flat electrode-lead-out-end surfaces of a rolled film capacitor are selectively removed by being brought into contact with hydrogen gas plasma so that electrodes 1a of the metallized films 1 are exposed out of the end surfaces and that the electrode-lead-out-end surfaces are formed with irregularities over 90% or more of their areas while limiting the depth of irregularities in the end surfaces to at most 0.2 mm, thereby obtaining suitable electrical contact between the electrodes 18a and the end surface electrodes 6 as well as a sufficient strength of attachment of the end surface electrodes 6 when the end surface electrodes 6 are formed. In this embodiment, wide films for film capacitors can be rolled up before they are cut and divided into unit capacitor bodies, thereby enabling mass production of rolled film capacitors with improved productivity.

This embodiment is free from a risk of oxidizing the electrodes because no oxygen gas is used in the process of selectively removing the electrode-lead-out-end surfaces as in the case of the third embodiment, but it is desirable to carefully select the method of this embodiment in consideration of the use of the capacitor because the processing speed is lower than that in a case where oxygen gas is used.

[Embodiment 7]

A rolled film capacitor manufacture process which represents a seventh embodiment of the present invention will be described below.

Figure 13:
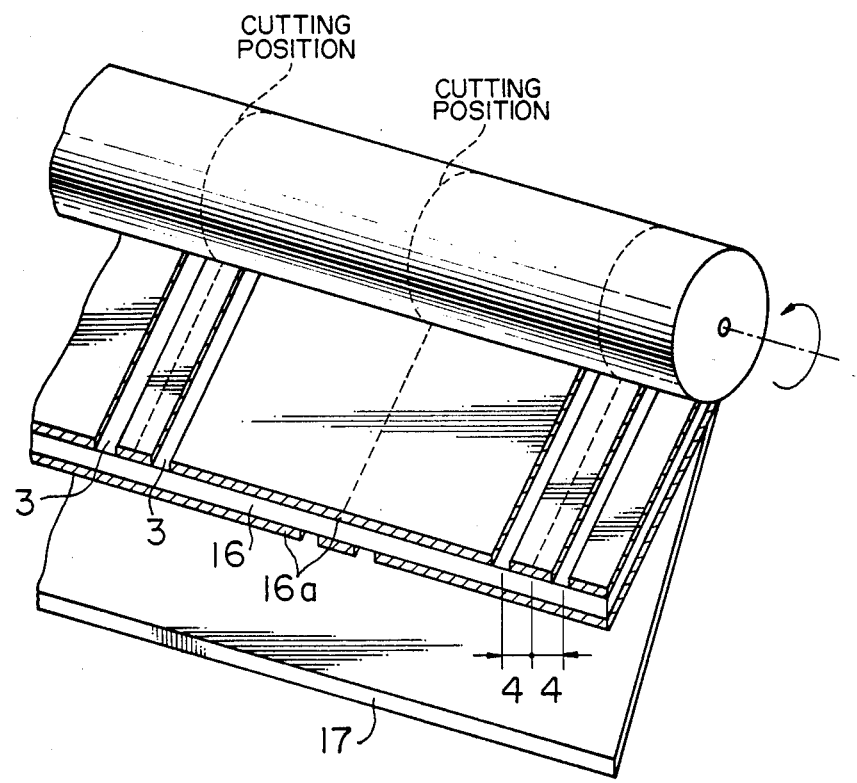
FIG. 13 is a diagram of an essential step of the process of manufacturing a rolled film capacitor in accordance with a seventh embodiment of the present invention.

FIGS. 13 shows part of a process of this embodiment. A reference numeral 16 in FIG. 13 denotes a two-side-metallized film formed of a wide PPS film and having a plurality of capacitor bodies. This film is metallized in such a manner that two groups of pairs of adjacent margin sections 4 of two metallic layers formed on opposite sides of the metallized film 16 are shifted from each other to an extent corresponding to ½ of the distance between the pairs of adjacent margin sections 4. Another wide PPS film 17 is laminated together with the film 16. These films are the same as those used in the third embodiment.

First, the wide two-side-metallized film 16 and the film 17 are superposed and rolled up, as shown in FIG. 13. A roll thereby obtained is cut at the centers of the pairs of adjacent margin sections 4 to form unit capacitor bodies. Then, the electrode-lead-out-end surfaces of each unit capacitor body are brought into contact with oxygen radicals generated by the oxygen plasma processing apparatus shown in FIG. 4. Portions of the films at the electrode-lead-out-end sides having a width smaller than the margin width 4 are thereby removed selectively. Thereafter, brass is sprayed on the end surfaces to form the end surface electrodes 6, thereby obtaining rolled capacitor bodies.

In accordance with this embodiment, the electrode-lead-out-end surfaces of the rolled film capacitor body are selectively removed by being brought into contact with oxygen radicals so that the electrodes 16a are exposed out of the end surfaces and that the electrode-lead-out-end surfaces are formed with irregularities over 90% or more of their areas while limiting the depth of irregularities in the end surfaces to at most 0.2 mm, thereby obtaining suitable electrical contact between the electrodes 16a and the end surface electrodes 6 as well as a sufficient strength of attachment of the end surface electrodes 6 when the end surface electrodes 6 are formed.

In this embodiment, wide films for film capacitors can be rolled up before they are cut and divided into unit capacitor bodies. It is therefore possible to mass-produce rolled film capacitors with improved productivity.

[Embodiment 8]

A rolled film capacitor manufacture process which represents an eighth embodiment of the present invention will be described below.

Figure 14:
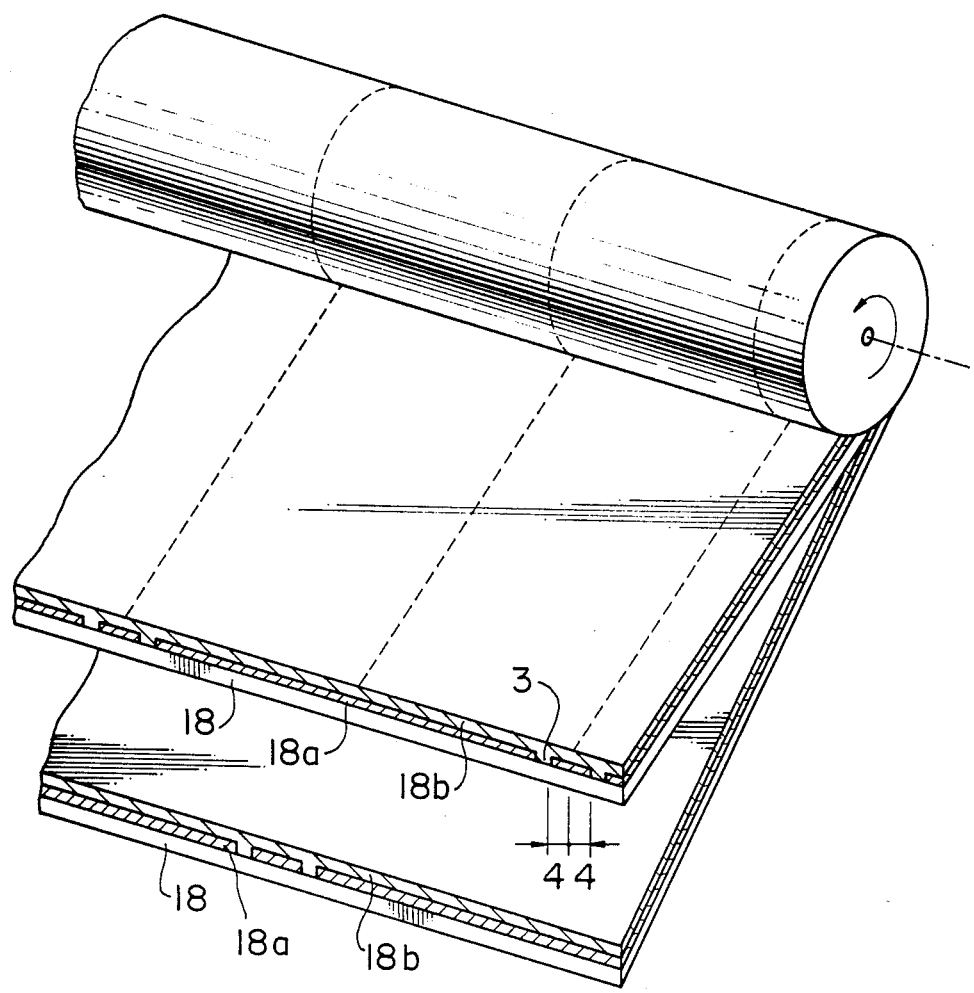
FIG. 14 is a diagram of an essential step of the process of manufacturing a rolled film capacitor in accordance with an eighth embodiment of the present invention.

FIG. 14 shows part of a process of this embodiment. A reference numeral 18 in FIG. 14 denotes one-side-metallized films each formed of a wide PPS film and having a plurality of capacitor bodies. A dielectric which is PPO is applied to the metallized side of each one-side-metallized film 18 to form a layer thereover. The thus-prepared films are the same as those used in the fourth embodiment.

First, two wide films 18 are superposed on the other and rolled up in such a manner that, as shown in FIG. 14, two groups of pairs of adjacent margin sections 4 formed in the two films are shifted from each other to an extent corresponding to ½ of the distance between the pairs of adjacent margin sections 4. A roll thereby obtained is cut at the centers of the pairs of adjacent margin sections 4 to form unit capacitor bodies. Then, the electrode-lead-out-end surfaces of each unit capacitor body are brought into contact with oxygen radicals generated by the apparatus shown in FIG. 4, thereby selectively removing portions of the films at the electrode-lead-out-end sides having a width smaller than the margin width 4. Thereafter, brass is sprayed on the end surfaces to form the end surface electrodes 6, thereby obtaining rolled capacitor bodies.

In accordance with this embodiment, the electrode-lead-out-end surfaces of the rolled film capacitor body are selectively removed by being brought into contact with oxygen radicals so that electrodes 18a of the metallized films 18 are exposed out of the end surfaces and that the electrode-lead-out-end surfaces are formed with irregularities over 90% or more of their areas while limiting the depth of irregularities in the end surfaces to at most 0.2 mm, thereby obtaining suitable electrical contact between the electrodes 18a and the end surface electrodes 6 as well as a sufficient strength of attachment of the end surface electrodes 6 when the end surface electrodes 6 are formed.

In this embodiment, wide films for film capacitors can be rolled up before they are cut and divided into unit capacitor bodies. It is therefore possible to mass-produce rolled film capacitors with improved productivity.

[Embodiment 9]

A rolled film capacitor manufacture process which represents a ninth embodiment of the present invention will be described below.

Figure 15:
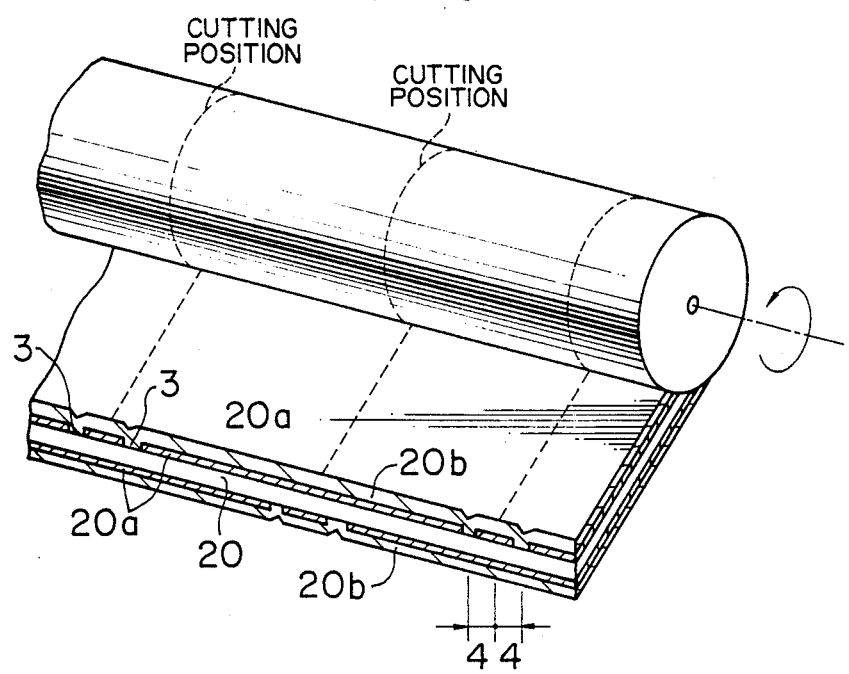
FIG. 15 is a diagram of an essential step of the process of manufacturing a rolled film capacitor in accordance with a ninth embodiment of the present invention.

FIG. 15 shows part of a process of this embodiment. A reference numeral 20 in FIG. 15 denotes a two-side-metallized film formed of a wide PPS film and having a plurality of capacitor bodies. This film is metallized in such a manner that two groups of pairs of adjacent margin sections 4 of two metallic layers respectively formed on opposite sides of the metallized film 20 are shifted from each other to an extent corresponding to ½ of the distance between the pairs of adjacent margin sections 4. A dielectric which is PPO is applied to both surfaces of the two-side-metallized film 20. The thus-prepared film is the same as that used in the fourth embodiment.

First, the film 20 is rolled, as shown in FIG. 15. A roll thereby obtained is cut at the centers of the pairs of adjacent margin sections 4, thereby forming unit capacitor bodies. Next, the electrode-lead-out-end surfaces of each unit capacitor body 5 are brought into contact with oxygen radicals generated by the oxygen plasma processing apparatus shown in FIG. 4. Portions of the film and the dielectric layers 20b at the electrode-lead-out-end sides having a width smaller than the margin width 4 are thereby removed selectively. Thereafter, brass is sprayed on the end surfaces to form the end surface electrodes, thereby obtaining rolled film capacitor bodies.

In accordance with this embodiment, the electrode-lead-out-end surfaces of the rolled film capacitor body are selectively removed by being brought into contact with oxygen radicals so that the electrodes 20a are exposed out of the end surfaces and that the electrode-lead-out-end surfaces are formed with irregularities over 90% or more of their areas while limiting the depth of irregularities to at most 0.2 mm, thereby obtaining suitable electrical contact between the electrodes 20a and the end surface electrodes 6 as well as a sufficient strength of attachment of the end surface electrodes 6 when the end surface electrodes 6 are formed. In this embodiment, wide films for film capacitors can be rolled up before they are cut and divided into unit capacitor bodies. It is therefore possible to mass-produce rolled film capacitors with improved productivity.

[Embodiment 10]

Figure 16:
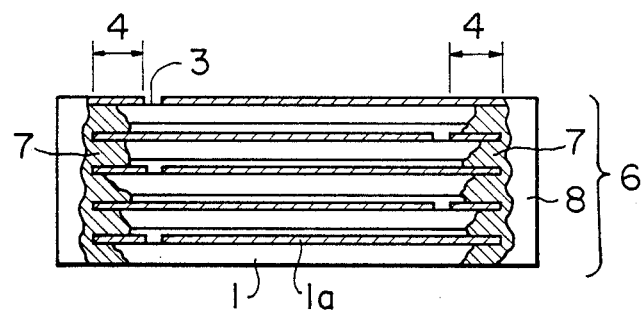
FIG. 16 is a cross-sectional view of a laminated film capacitor in accordance with a tenth embodiment of the present invention.

FIG. 16 shows a cross section of a laminated film capacitor which represents a tenth embodiment of the present invention.

A capacitor body shown in FIG. 16 has one-side-metallized films 16 formed of PPS films, aluminum deposited layers 1a which serve as electrodes, blank sections 3, margin sections defined by margin width 4, and end surface electrodes 6. The structure of this capacitor body is similar to that shown in FIG. 1. The difference between this capacitor body and the capacitor body shown in FIG. 1 resides in that an aluminum contact layer 7 having a width of 3 μm formed by low-temperature sputtering is formed between each electrode-lead-out-end surface and brass conductive layer formed by spraying.

A laminated film capacitor having this structure is manufactured by a process described below.

A unit capacitor body 5 is formed in the same manner as the first embodiment. The electrode-lead-out-end surfaces of the unit capacitor body 5 are brought into contact with oxygen radicals by the oxygen plasma processing apparatus used in the second embodiment, thereby selectively removing end surfaces portions of the films having a width smaller than the margin width 4. The electrodes 1a of the one-side-metallized films 1 are thereby exposed in such a manner that the electrode-lead-out-end surfaces are formed with irregularities over 90% or more of their areas while limiting the depth of irregularities to at most 0.2 mm. This step is the same as that described above with respect to the second embodiment. In this embodiment, additional processing is performed; that is contact layers having a thickness of 3 μm are formed by low-temperature sputtering on the end surfaces where the electrodes 1a of the one-side-metallized films 1 are exposed. Thereafter, brass is sprayed to form the end surface electrodes 6.

Thus, the aluminum contact layers having a thickness of 3 μm are formed by low-temperature sputtering between the end surfaces at which film portions have been chemically removed selectively by oxygen plasma processing and the conductive layers 8 formed from brass by spraying, thereby further improving the tan δ characteristics of the film capacitor.

Figure 17:
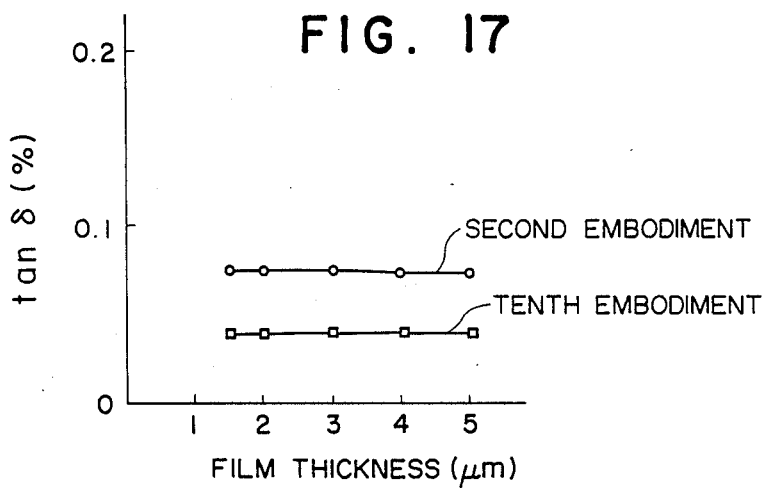
FIG. 17 is a graph of the relationship between the thickness and tan $\delta$ of each of film capacitors manufactured in accordance with the second and tenth embodiment of the present invention, illustrating comparison therebetween.
Figure 18A:
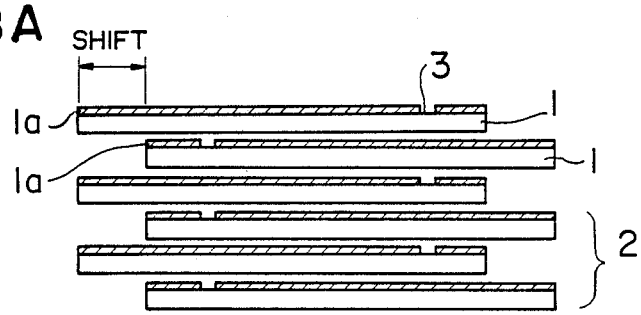
FIG. 18A is diagram of an ideal construction of a conventional rolled film capacitor.
Figure 18B:
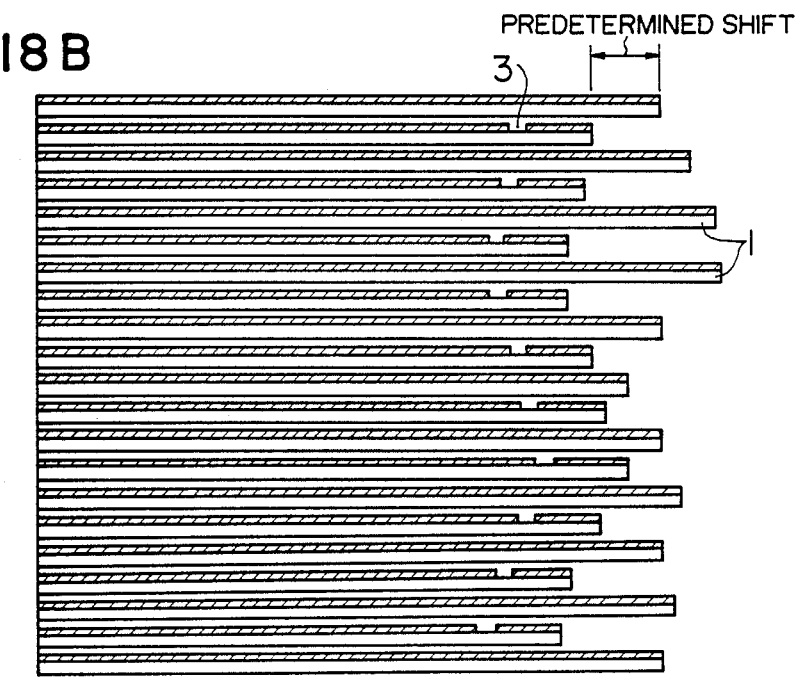
FIG. 18B is a diagram of the actual construction of the conventional film capacitor shown in FIG. 18A.
Figure 19:
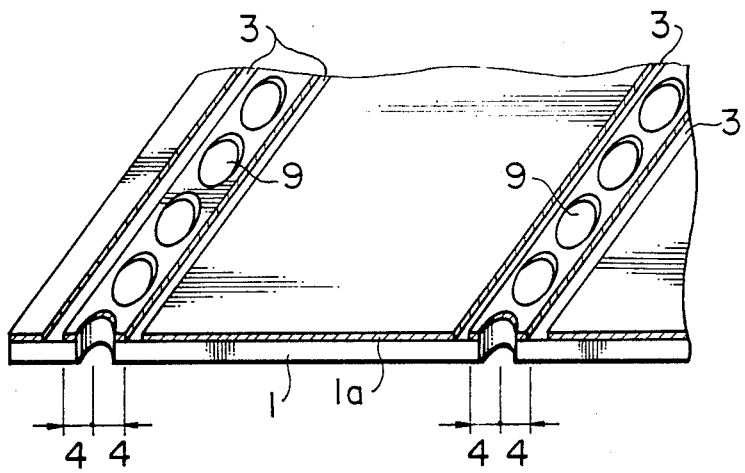
FIGS. 19, 20, 21, 22A to 22C are diagrams of a method of manufacturing a conventional laminated film capacitor.
Figure 20:
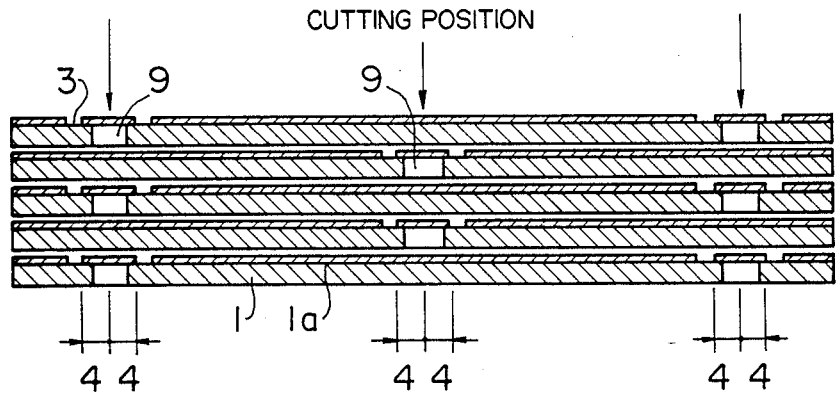
Figure 21:
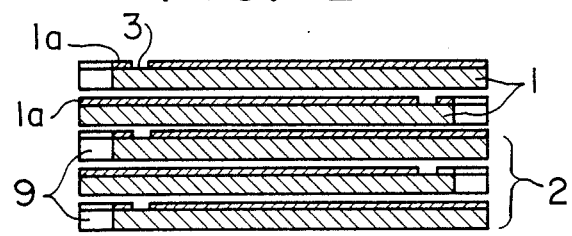

FIG. 17 shows the comparison between the second and tenth embodiments with respect to the relationship between the thickness and tan δ of the film capacitors manufactured in accordance with these embodiments.

In the first to tenth embodiments, the end surface electrodes are formed by brass spraying. However, the end surface electrodes may be formed by spraying a different metal or solid solution which forms an eutectic with aluminum. Instead, the end surface electrodes may be formed by applying a conductive coating, by hot dipping with a metal having a low melting point lower than the heat resistance point of the film capacitor, or by a vacuum plating process such as low-temperature sputtering or vacuum evaporation. In the tenth embodiment, the contact layer between each electrode-lead-out-end surface and the conductive layer formed by brass spraying is formed from aluminum by low-temperature sputtering. However, the contact layer may be formed from a metal different from aluminum or solid solution capable of forming an eutectic with brass, by low-temperature sputtering or by vacuum plating process such as vacuum evaporation.

In the first to tenth embodiments, PPS films are used to form capacitor bodies. Instead, polyethylene terephthalate or polypropylene may be used. Also, polycarbonate may be used instead of PPO used as a dielectric applied as coating to the metallized films in the fourth, fifth, seventh and eighth embodiments.

For selective removal of the electrode-lead-out-end surfaces based on chemical means, one of methods of using oxygen plasma, a method of using oxygen radicals extracted from oxygen plasma, a method of using ozone, a method of using fluorine gas plasma and a method of hydrogen gas plasma may be adopted for each of first to fourth embodiments. In first, second, seventh to tenth embodiments, at least one of $CF_4$, $SF_6$ and $N_2O$ may be added to the oxygen gas in order to increase the dielectric removing speed. With respect to the third embodiment, it is possible to increase the dielectric removing speed by adding a small quantity of $N_2O$ to the ozone gas or by irradiation with ultraviolet rays.

Figure 22A:
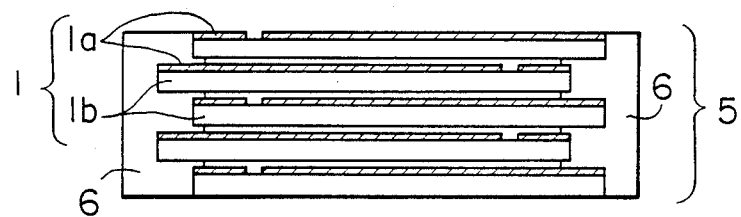
Figure 22B:
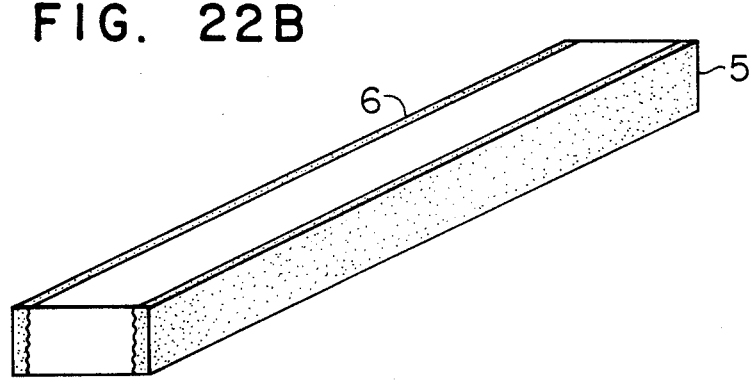
Figure 22C:
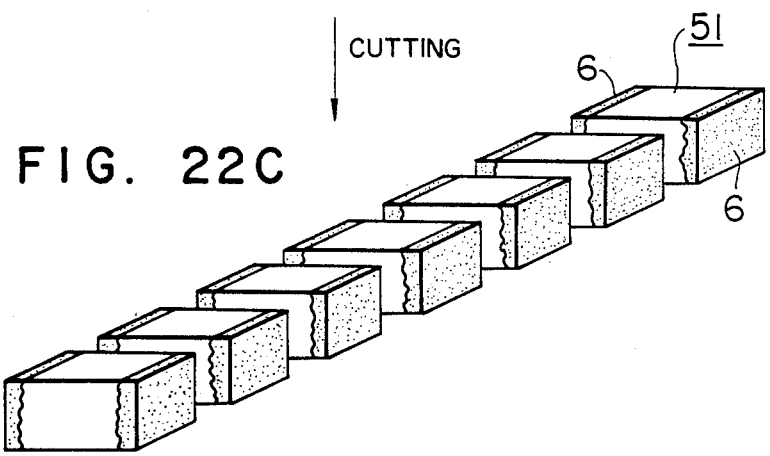

The margin sections 4 of the film capacitor bodies 5 of the first to tenth embodiments may alternately disposed at one of the opposite ends, for example, as shown in FIGS. 22.

In accordance with the present invention, as described above, the end surfaces of a film capacitor body which are flat and which are to be processed for connection to lead electrodes are brought into contact with a gas having at least a component reactive with an organic material which forms dielectric films of the film capacitor body, and the dielectric films at the electrode-lead-out-end sides are thereby chemically removed selectively so that metallic layer electrodes are exposed out of the end surfaces and that the electrode-lead-out-end surfaces are formed with irregularities over 90% or more of their areas while limiting the depth of irregularities to at most 0.2 mm, thereby obtaining suitable electrical contact between the metallic layer electrodes and the end surface electrodes as well as sufficient strength of attachment of the end surface electrodes. Thus, the present invention enables laminated or rolled film capacitors having improved characteristics to be mass-produced with improved productivity.

What is claimed is:

1. A method of manufacturing a film capacitor comprising: the steps of preparing a lamination or roll of a plurality of electrodes and at least one dielectric film formed from an organic material and interposed between said electrodes; selectively removing portions of said dielectric film at electrode-lead-out-end sides of said roll or lamination where end surfaces of said dielectric film are flush with those of said electrodes by bringing surfaces of said roll or lamination at the electrode-lead-out end sides in contact with a gas having at least a component reactive with said organic material; and forming end-surface electrodes at the electrode-lead-out-end sides.

2. A method of manufacturing a film capacitor according to claim 1, wherein portions of said dielectric film at the electrode-lead-out-end sides are selectively removed by a plasma containing at least oxygen.

3. A method of manufacturing a film capacitor according to claim 1, wherein portions of said dielectric film at the electrode-lead-out-end sides are selectively removed by a plasma of a gas which contains oxygen and to which at least one of $CF_4$, $SF_6$ and $N_2O$ is added.

4. A method of manufacturing a film capacitor according to claim 1, wherein portions of said dielectric film at the electrode-lead-out-end sides are selectively removed by oxygen radicals extracted from a plasma containing at least oxygen.

5. A method of manufacturing a film capacitor according to claim 1, wherein portions of said dielectric film at the electrode-lead-out-end sides are selectively removed by a gas containing at least ozone.

6. A method of manufacturing a film capacitor according to claim 1, wherein portions of said dielectric film at the electrode-lead-out-end sides are selectively removed by a gas formed by adding $N_2O$ to a gas containing at least ozone.

7. A method of manufacturing a film capacitor according to either one of claims 5 and 6, wherein portions of said dielectric film at the electrode-lead-out-end sides are irradiated with ultraviolet rays when selectively removed.

8. A method of manufacturing a film capacitor according to claim 1, wherein portions of said dielectric film at the electrode-lead-out-end sides are selectively removed by a gas plasma containing at least fluorine or hydrogen.

9. A method of manufacturing a laminated capacitor comprising the steps of: rolling up or layering a wide one-side-metallized film having a plurality of capacitor bodies; cutting a roll or lamination obtained by the preceding step at electrode-lead-out-end sides; selectively removing portions of said film at the electrode-lead-out-end sides by bringing surfaces of said roll or lamination at the electrode-lead-out-end sides into contact with a gas containing at least a component reactive with an organic material constituting said film; and forming end surface electrodes at the electrode-lead-out-end sides.

10. A method of manufacturing a laminated capacitor comprising the steps of: rolling up or layering a wide two-side-metallized film 16 having a plurality of capacitor bodies together with a wide doubling film while superposing said films one on the other; cutting a roll or lamination obtained by the preceding step at electrode-lead-out-end sides; selectively removing portions of said films at the electrode-lead-out-end sides by bringing surfaces of said roll or lamination at the electrode-lead-out-end sides into contact with a gas containing at least a component reactive with organic materials constituting said films; and forming end surface electrodes at the electrode-lead-out-end sides.

11. A method of manufacturing a laminated capacitor comprising the steps of: forming a dielectric layer from an organic material on the metallized side of a wide one-side-metallized film having a plurality of capacitor bodies; rolling up or layering said one-side-metallized film with said dielectric layer; cutting a roll or lamination obtained by the preceding step at electrode-lead-out-end sides; selectively removing portions of said film and said dielectric layer at the electrode-lead-out-end sides by bringing surfaces of said roll or lamination at the electrode-lead-out-end sides into contact with a gas containing at least a component reactive with organic materials constituting said film and said dielectric layers; and forming end surface electrodes at the electrode-lead-out-end sides.

12. A method of manufacturing a laminated capacitor comprising the steps of: forming dielectric layers from an organic material on both sides of a wide two-side-metallized film having a plurality of capacitor bodies; rolling up or layering said two-side-metallized film with said dielectric layers; cutting a roll or lamination obtained by the preceding step at electrode-lead-out-end sides; selectively removing portions of said film and said dielectric layers at the electrode-lead-out-end sides by bringing surfaces of said roll or lamination at the electrode-lead-out-end sides into contact with a gas containing at least a component reactive with organic materials constituting said film and said dielectric layers; and forming end surface electrodes at the electrode-lead-out-end sides.

13. A method of manufacturing a rolled film capacitor comprising the steps of: rolling up two wide sheets of one-side-metallized film having a plurality of capacitor bodies while superposing said sheets one on the other; cutting a roll obtained by the preceding step at electrode-lead-out-end sides; selectively removing portions of said sheets at the electrode-lead-out-end sides by bringing surfaces of said roll at the electrode-lead-out-end sides into contact with a gas containing at least a component reactive with an organic material constituting said film; and forming end surface electrodes at the electrode-lead-out-end sides.

14. A method of manufacturing a rolled film capacitor comprising the steps of: rolling up a wide two-side-metallized film having a plurality of capacitor bodies together with a wide doubling film while superposing said films one on the other; cutting a roll obtained by the preceding step at electrode-lead-out-end sides; selectively removing portions of said films at the electrode-lead-out-end sides by bringing surfaces of said roll at the electrode-lead-out-end sides into contact with a gas containing at least a component reactive with organic materials constituting said films; and forming end surface electrodes at the electrode-lead-out-end sides.

15. A method of manufacturing a laminated capacitor comprising the steps of: applying a dielectric coating formed from an organic material on the metallized side of a wide one-side-metallized film having a plurality of capacitor bodies; rolling up two sheets of said one-side-metallized film to which said dielectric has been applied while superposing said sheets one on the other; cutting a roll obtained by the preceding step at electrode-lead-out-end sides; selectively removing portions of said film and said dielectric coating at the electrode-lead-out-end sides by bringing surfaces of said roll at the electrode-lead-out-end sides into contact with a gas containing at least a component reactive with organic materials constituting said film and said dielectric coating; and forming end surface electrodes at the electrode-lead-out-end sides.

16. A method of manufacturing a laminated capacitor comprising the steps of: forming dielectric layers formed from an organic material on both sides of a wide two-side-metallized film having a plurality of capacitor bodies; rolling up said two-side-metallized film with said dielectric layers; cutting a roll obtained by the preceding step at electrode-lead-out-end sides; selectively removing portions of said film and said dielectric layers at the electrode-lead-out-end sides by bringing surfaces of said roll at the electrode-lead-out-end sides into contact with a gas containing at least a component reactive with organic materials constituting said film and said dielectric layers, and forming end-surface electrodes at the electrode-lead-out-end sides.

17. A method of manufacturing a laminated capacitor according to any one of claims 1 to 16 wherein each of said end surface electrodes is formed of a contact layer formed by vacuum plating process and a conductive layer formed by spraying.

18. A film capacitor comprising: a plurality of superposed laminations having two electrodes lead-out sides, each of said laminations comprising a dielectric film and an electrode layer formed on said dielectric film, said electrode layer having marginal sections which project from said first dielectric film on both said electrode lead-out sides; and end surface electrodes formed on both said electrode lead-out sides such that said marginal sections of said electrode layer are embedded in said end surface electrodes, said dielectric films having first and second ends which are disposed respectively on both said electrode lead-out sides, said first ends being non-aligned with each other and said second ends being non-aligned with each other respectively on said electrode lead-out sides so as to enhance electrical connection and binding strength between said electrode layer and said end surface electrodes.

19. A film capacitor as set forth in claim 18, wherein said marginal sections embedded in said end surface electrodes have lengths greater than 5 microns.

20. An oxygen plasma processing apparatus adapted to be used to manufacture a film capacitor including a mother capacitor body formed on a plurality of laminations having electrode lead-out sides, with each of said laminations comprising a dielectric film and an electrode applied on the dielectric film, said apparatus comprising:

a vacuum vessel made substantially of electroconductive materials and having a hollow chamber;

a quartz window formed in said vessel;

a high frequency wave applying electrode attached at said quartz glass window;

a mask member for masking all surfaces of said mother capacitor body except surfaces thereof at said electrode lead-out sides;

a metal screen positioned in said hollow chamber and interposed between said high frequency wave applying electrode and a said mother capacitor body disposed in said hollow chamber; and means for bringing said mother capacitor body disposed in said hollow chamber into contact with oxygen gas plasma in an oxygen plasma atmosphere in said hollow chamber so as to process surfaces on said electrode lead-out sides of said laminations in order to form electrode lead-out-end surfaces thereon having first and second extreme ends, said first ends being non-aligned with each other and said second ends being non-aligned with each other respectively on said electrode lead-out sides, whereby said metal screen traps oxygen ions so as to allow only oxygen radicals to reach said mother capacitor body disposed in said hollow chamber.

* * * * *